United States Patent
Murata et al.

(10) Patent No.: US 10,181,616 B2
(45) Date of Patent: Jan. 15, 2019

(54) FUEL CELL VEHICLE

(71) Applicant: TOYOTA JIDOSHA KABUSHIKI KAISHA, Toyota-shi, Aichi-ken (JP)

(72) Inventors: Shigeaki Murata, Nisshin (JP); Takanori Otsura, Toyota (JP); Yasuhiko Ohashi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/873,148

(22) Filed: Jan. 17, 2018

(65) Prior Publication Data
US 2018/0205106 A1 Jul. 19, 2018

(30) Foreign Application Priority Data

Jan. 18, 2017 (JP) ................. 2017-006287

(51) Int. Cl.
*B60K 8/00* (2006.01)
*B60K 13/04* (2006.01)
(Continued)

(52) U.S. Cl.
CPC ....... *H01M 8/2485* (2013.01); *B60L 11/1892* (2013.01); *B60L 11/1896* (2013.01); *B62D 21/152* (2013.01); *B62D 25/08* (2013.01); *H01M 8/04388* (2013.01); *H01M 2250/20* (2013.01)

(58) Field of Classification Search
CPC .............. B60K 8/00; B60K 2001/0438; B60K 2015/0635; B60K 13/04; B60L 11/1896
See application file for complete search history.

(56) References Cited

U.S. PATENT DOCUMENTS

| 2009/0032318 A1* | 2/2009 | Ishitoya ................... B60K 1/04 180/65.31 |
| 2010/0003576 A1* | 1/2010 | Tamura ............. H01M 8/04104 429/418 |

(Continued)

FOREIGN PATENT DOCUMENTS

| JP | 2015-231319 | 12/2015 |
| JP | 2017-47842 | 3/2017 |

OTHER PUBLICATIONS

U.S. Appl. No. 15/795,853, "Fuel Cell Vehicle," filed Oct. 27, 2017.

*Primary Examiner* — Bryan A Evans
(74) *Attorney, Agent, or Firm* — Finnegan, Henderson, Farabow, Garrett & Dunner, LLP

(57) ABSTRACT

A fuel cell vehicle includes a fuel cell stack, a tank, a discharge flow path discharging a fluid discharged from the fuel cell stack, a muffler attached to the discharge flow paths, and a vehicle member defining a first chamber and a second chamber, the first chamber accommodating the fuel cell stack and the second chamber being disposed behind the first chamber and accommodating the tank and the muffler. The second chamber is also provided with a front portion and a rear portion continuous with the front portion, the rear portion being shorter than the front portion in average length in a vehicle width direction. The muffler is disposed between the tank and one of a pair of side wall portions defining side walls of the front portion in the vehicle width direction.

12 Claims, 3 Drawing Sheets

(51) Int. Cl.
  *H01M 8/2485* (2016.01)
  *B60L 11/18* (2006.01)
  *B62D 25/08* (2006.01)
  *H01M 8/0438* (2016.01)
  *B62D 21/15* (2006.01)

(56) References Cited

U.S. PATENT DOCUMENTS

2012/0080253 A1* 4/2012 Katano .................. B60K 1/00
                                                  180/68.1
2017/0066479 A1  3/2017 Murata
2017/0096172 A1  4/2017 Nagaosa
2017/0282709 A1* 10/2017 Sasaki .............. B60K 15/03006

* cited by examiner

FUEL CELL VEHICLE

INCORPORATION BY REFERENCE

The disclosure of Japanese Patent Application No. 2017-006287 filed on Jan. 18, 2017 including the specification, drawings and abstract is incorporated herein by reference in its entirety.

BACKGROUND

1. Technical Field

The present disclosure relates to a fuel cell vehicle in which a fuel cell is mounted.

2. Description of Related Art

A fuel cell vehicle that has a structure in which a fuel cell stack is accommodated in an accommodating chamber in front of an occupant compartment and a hydrogen gas storage tank is accommodated in a tunnel-shaped hydrogen tank chamber disposed under the floor of the occupant compartment has been proposed as a fuel cell vehicle (refer to Japanese Unexamined Patent Application Publication No. 2015-231319 (JP 2015-231319 A)). In the fuel cell vehicle that is disclosed in JP 2015-231319 A, a discharge flow path is connected to the fuel cell stack and the discharge flow path takes out off gas and water resulting from an electrochemical reaction and guides the off gas and the water to the atmosphere. A muffler for exhaust sound reduction may be attached to the discharge flow path. Muffler installation in the hydrogen tank chamber positioned at the lower part of the fuel cell vehicle has been requested so that drainage can be expedited, a reverse water flow toward the fuel cell stack can be prevented, and so on.

SUMMARY

The hydrogen tank chamber in the fuel cell vehicle that is disclosed in JP 2015-231319 A, however, has relatively little free space to accommodate a device other than the tank. Accordingly, no muffler can be installed in the hydrogen tank chamber as the muffler interferes with the tank when installed in the hydrogen tank chamber. Although the muffler can be installed in a large hydrogen tank chamber, an increase in the size of the hydrogen tank chamber leads to the expansion of the protruding region of the floor part of the occupant compartment that corresponds to the hydrogen tank chamber, and then a problem arises with the volume of the occupant compartment reduced. In this regard, a technique has been desired with which a reduction in the volume of the occupant compartment of a fuel cell vehicle can be suppressed with muffler installation allowed in a tank accommodating chamber of the fuel cell vehicle.

An aspect relates to a fuel cell vehicle including a fuel cell stack, a tank storing gas to be supplied to the fuel cell stack, a discharge flow path discharging a fluid to be discharged from the fuel cell stack, a vehicle member, and a muffler attached to the discharge flow paths. The vehicle member defines a first chamber and a second chamber, the first chamber accommodating the fuel cell stack and the second chamber being disposed behind the first chamber in a vehicle length direction of the fuel cell vehicle and accommodating the tank and the muffler. The second chamber has a front portion and a rear portion continuous with the front portion in the vehicle length direction, and an average length of the rear portion in a width direction of the fuel cell vehicle is shorter than an average length of the front portion in the width direction. The muffler is disposed between the tank and one of a pair of side wall portions defining side walls of the front portion in the width direction.

According to the aspect, the muffler is disposed between the side wall portion and the tank in the front portion and the front portion is longer than the rear portion in average length in the width direction. Accordingly, the muffler can be disposed in the second chamber while interference of the muffler with the tank is suppressed. The average length of the rear portion in the width direction is shorter than the average length of the front portion in the width direction and the muffler is not disposed in the rear portion of the second chamber, and thus a reduction in the volume of an occupant compartment that is attributable to muffler installation can be suppressed.

In the fuel cell vehicle according to the aspect, the front portion may be configured to have a length in the width direction decreasing from a front of the front portion toward a rear of the front portion along the vehicle length direction. According to the aspect, the front portion is configured such that its length in the width direction decreases from the front of the front portion toward the rear of the front portion along the vehicle length direction. Accordingly, a reduction in the volume of the occupant compartment can be suppressed.

In the fuel cell vehicle according to the aspect, the front portion may be configured to have a vertical-direction height decreasing from the front of the front portion toward the rear of the front portion along the vehicle length direction.

In the fuel cell vehicle according to the aspect, the rear portion may be configured such that an average vertical-direction height of the rear portion is lower than an average vertical-direction height of the front portion.

The fuel cell vehicle according to the aspect may further include a first attachment member disposed in the front portion. The tank may be attached to the fuel cell vehicle by the first attachment member. The first attachment member may be disposed in front of the muffler in the vehicle length direction. According to the aspect, the first attachment member is disposed in front of the muffler in the vehicle length direction. Accordingly, interference of the first attachment member with the muffler can be suppressed. In a case where the front portion is configured such that its length in the width direction decreases from the front of the front portion toward the rear of the front portion along the vehicle length direction, the first attachment member is attached to a part that has a larger spatial volume unlike in a configuration in which the attachment member is disposed at the same position as or behind the muffler in the vehicle length direction. Accordingly, a worker can attach the tank with ease.

In the fuel cell vehicle according to the aspect, the muffler may be disposed in the front portion of the second chamber and the tank may be disposed across the front portion and the rear portion of the second chamber. The fuel cell vehicle may further include a second attachment member disposed in the rear portion of the second chamber. The tank may be attached to the fuel cell vehicle by the second attachment member.

The fuel cell vehicle according to the aspect may further include a floor panel positioned above the second chamber and partitioning the second chamber from a third chamber accommodating front seats and rear seats. The muffler may be disposed in front of the rear seats in the vehicle length direction. According to the aspect, the muffler is disposed in front of the rear seats in the vehicle length direction. Accordingly, the expansion of an upward protruding region that is attributable to the disposition of the muffler can be suppressed on the floor in the vicinity of the rear seats and a reduction in spatial volume can be suppressed in the vicinity of the rear seats. A decrease in the area of the foot spaces of the rear seats can be suppressed.

In the fuel cell vehicle according to the aspect, the muffler may be disposed behind and below the fuel cell stack in the vehicle length direction. According to the aspect, the muffler is disposed behind and below the fuel cell stack in the vehicle length direction. Accordingly, the fluid (liquid) that is discharged from the fuel cell stack can be guided to the muffler by means of gravity and a reverse flow of the discharged fluid toward the fuel cell stack can be suppressed.

In the fuel cell vehicle according to the aspect, the front portion may be configured to have a vertical-direction length decreasing from the front of the front portion toward the rear of the front portion along the vehicle length direction. According to the aspect, the front portion is configured such that its vertical-direction length decreases from the front of the front portion toward the rear of the front portion. Accordingly, a reduction in the volume of the occupant compartment can be suppressed while the space for the disposition of the muffler is ensured.

In the fuel cell vehicle according to the aspect, the second chamber may be disposed along the vehicle length direction at a middle of the fuel cell vehicle in a vehicle width direction.

In the fuel cell vehicle according to the aspect, the side wall portions may be disposed with a gap in the vehicle width direction, and the side wall portions may be disposed such that a length of the gap increases from a vertical top toward a vertical bottom of the front portion.

In the fuel cell vehicle according to the aspect, the discharge flow path may be inclined such that a front part of the discharge flow path is higher than a rear part of the discharge flow path.

The aspect can be realized in various forms. It can be realized in the form of, for example, a method for manufacturing a fuel cell vehicle and a method for mounting a muffler in a fuel cell vehicle.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
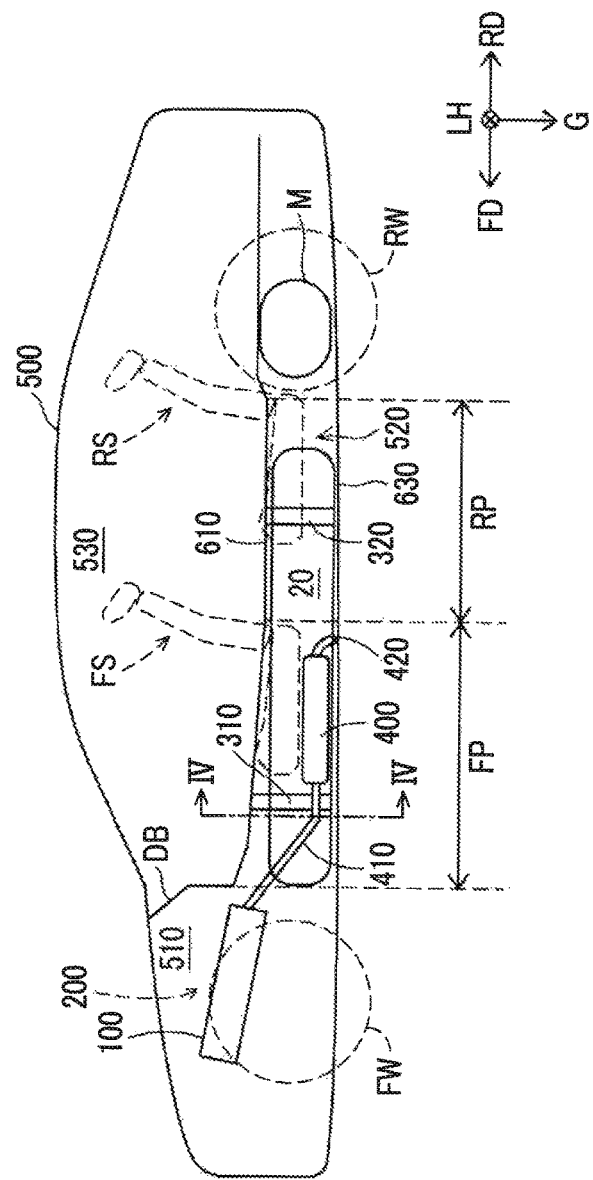
FIG. 1 is an explanatory diagram in which a schematic configuration of a fuel cell vehicle according to an embodiment is shown in sectional view.
Figure 2:
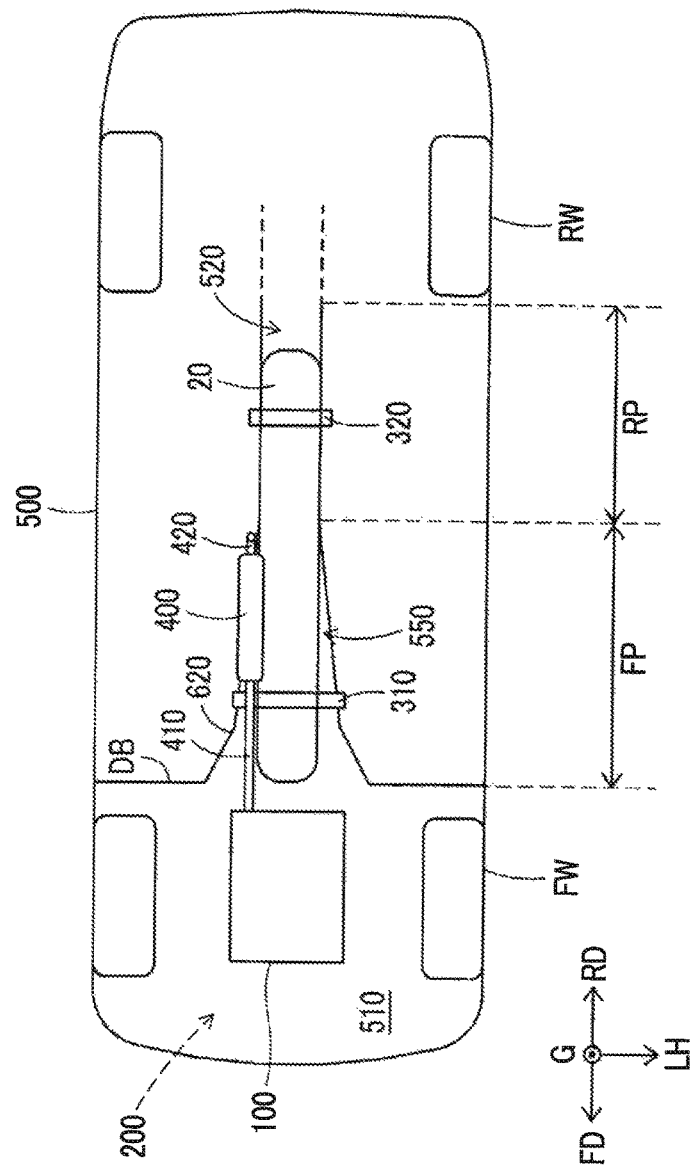
FIG. 2 is an explanatory diagram in which the schematic configuration of the fuel cell vehicle is shown in bottom view.

A. Embodiment
A1. Overall Configuration of Vehicle
FIG. 1 is an explanatory diagram in which a schematic configuration of a fuel cell vehicle 500 according to an embodiment is shown in sectional view. FIG. 2 is an explanatory diagram in which the schematic configuration of the fuel cell vehicle 500 is shown in bottom view. The section of the vehicle at the middle position of the fuel cell vehicle 500 in a vehicle width direction LH that is along a forward direction FD and a rearward direction RD is illustrated in FIG. 1. FIG. 2 illustrates the schematic configuration of the fuel cell vehicle 500 when the fuel cell vehicle 500 is seen in the direction opposite to its vertical bottom G (toward the vertical top of the vehicle). In the present embodiment, the forward direction FD and the rearward direction RD will be collectively referred to as a "vehicle length direction". The fuel cell vehicle 500 has a fuel cell stack 100 mounted as an electric power source. Rear wheels RW are driven by a motor M, which is a power source, being driven by the electric power that is supplied from the fuel cell stack 100. The respective signs and arrows indicating the directions that are illustrated in FIG. 1 correspond to the respective signs and arrows indicating the directions that are illustrated in the other drawings.

A first chamber 510, a second chamber 520, and a third chamber 530 are formed in the fuel cell vehicle 500. The first chamber 510 is positioned on the forward direction FD side of the fuel cell vehicle 500 and is formed as a space including the region that is between a pair of front wheels FW. The second chamber 520 is positioned on the vertical bottom G side of the fuel cell vehicle 500 and behind the first chamber 510 in the rearward direction RD. The first chamber 510 and the second chamber 520 communicate with each other. The third chamber 530 is positioned above the second chamber 520 and behind the first chamber 510 in the rearward direction RD. The third chamber 530 is a so-called occupant compartment. Front seats FS and rear seats RS are accommodated in the third chamber 530. The first chamber 510 is partitioned from the second chamber 520 and the third chamber 530 by a dashboard DB (an example of a vehicle member). The second chamber 520 and the third chamber 530 are partitioned from each other by a floor panel 610 (an example of the vehicle member).

The first chamber 510 accommodates the functional portion that includes the fuel cell stack 100 as one of the functional portions constituting a fuel cell system 200. The fuel cell stack 100 is a stack including a plurality of stacked single cells (a plurality of single cells 11 to be described later). The configuration of the fuel cell stack 100 and the configuration of the fuel cell system 200 will be described in detail later. As illustrated in FIG. 1, the fuel cell stack 100 is disposed such that it is inclined downward toward the rearward direction RD side in the vehicle length direction. In other words, the fuel cell stack 100 is disposed at an angle to the horizontal direction such that its position becomes lowered in the rearward direction RD. Water in the fuel cell stack 100 is gathered in the rearward direction RD by gravity and is easily discharged from the fuel cell stack 100 because the fuel cell stack 100 is disposed at an angle as described above.

The second chamber 520 accommodates a tank 20 storing hydrogen gas, a muffler 400, a part of a first discharge flow path 410, and a second discharge flow path 420. The second chamber 520 is formed under the floor of the fuel cell vehicle 500 and behind the first chamber 510 in the rearward direction RD. In addition, the second chamber 520 is formed along the vehicle length direction substantially in the middle of the vehicle width direction LH. The floor panel 610 (an example of the vehicle member) forms the ceiling part of the second chamber 520 and the floor part of the third chamber 530. The part of the floor of the third chamber 530 that corresponds to the second chamber 520 protrudes toward the top of the vehicle in comparison to the other parts. In this manner, the second chamber 520 has a shape similar to that of the center tunnel of an engine-mounted vehicle in which a drive shaft is disposed. The muffler 400 is connected to the fuel cell stack 100 via the first discharge flow path 410 and reduces the exhaust sound that is generated when a fluid consisting of off gas and water is discharged from the fuel cell stack 100. In the present embodiment, the "fluid" contains anode side off gas, cathode side off gas, and the water that is contained in each of the anode side off gas and the cathode side off gas. The first discharge flow path 410 connects the fuel cell stack 100 and the muffler 400 to each other. The second discharge flow path 420 has a first end connected to the muffler 400 and an open second end. The second discharge flow path 420 releases the fluid to the atmosphere after fluid passes through the muffler 400.

The second chamber 520 is provided with a front portion FP and a rear portion RP. The front portion FP is positioned at the foremost part of the second chamber 520 in the forward direction FD and leads to the first chamber 510. As illustrated in FIG. 1, the front portion FP is configured such that its vertical-direction length (height) gradually decreases in the rearward direction RD. As illustrated in FIG. 2, the front portion FP is configured such that its length (width) in the vehicle width direction LH gradually decreases in the rearward direction RD. As both the height and the width of the front portion FP gradually decrease in the rearward direction RD as described above, a reduction in the volume of the third chamber 530, the vicinity of the front seats FS (driver's seat and passenger seat) that correspond to the front portion FP in particular, can be suppressed. As illustrated in FIGS. 1 and 2, the front portion FP accommodates substantially half of the front side of the tank 20, the muffler 400, a part of the first discharge flow path 410, and the second discharge flow path 420. The tank 20 is attached to side wall portions 620 by a first attachment member 310 and a second attachment member 320. Each of the first attachment member 310 and the second attachment member 320 includes a band portion surrounding the tank 20 in its outer peripheral direction and an attachment portion allowing the band portion to be attached to the side wall portions 620. In the front portion FP, the tank 20 is attached by the first attachment member 310. In the rear portion RP, the tank 20 is attached by the second attachment member 320. The attachment position of the muffler 400 will be described in detail later. The first attachment member 310 corresponds to a subordinate concept of the "attachment member" in the Means for Solving the Problem of the specification.

The rear portion RP continues from the front portion FP in the rearward direction RD. In the present embodiment, the rear portion RP has a rear end positioned in the vicinity of the tips of the rear wheels RW in the vehicle length direction. As illustrated in FIG. 1, the vertical-direction length (height) of the rear portion RP is almost constant over the vehicle length direction. In addition, the vertical-direction length is equal to the vertical-direction length of the end portion of the front portion FP in the rearward direction RD. Accordingly, in the present embodiment, the average vertical-direction length of the rear portion RP is shorter than the average vertical-direction length of the front portion FP. Likewise, the length (width) of the rear portion RP in the vehicle width direction LH is almost constant over the vehicle length direction as illustrated in FIG. 2. In addition, the length in the vehicle width direction LH is equal to the length of the end portion of the front portion FP in the rearward direction RD that is measured in the vehicle width direction LH. Accordingly, in the present embodiment, the average length of the rear portion RP in the vehicle width direction LH is shorter than the average length of the front portion FP in the vehicle width direction LH. A reduction in the volume of the third chamber 530, the vicinity of the rear seats RS that correspond to the rear portion RP in particular, can be suppressed because of the above-described configuration in which the rear portion RP is shorter than the front portion FP in average vertical-direction length and average length in the vehicle width direction LH alike. The rear portion RP accommodates substantially half of the rear side of the tank 20.

A2. Configuration of Fuel Cell System

Figure 3:
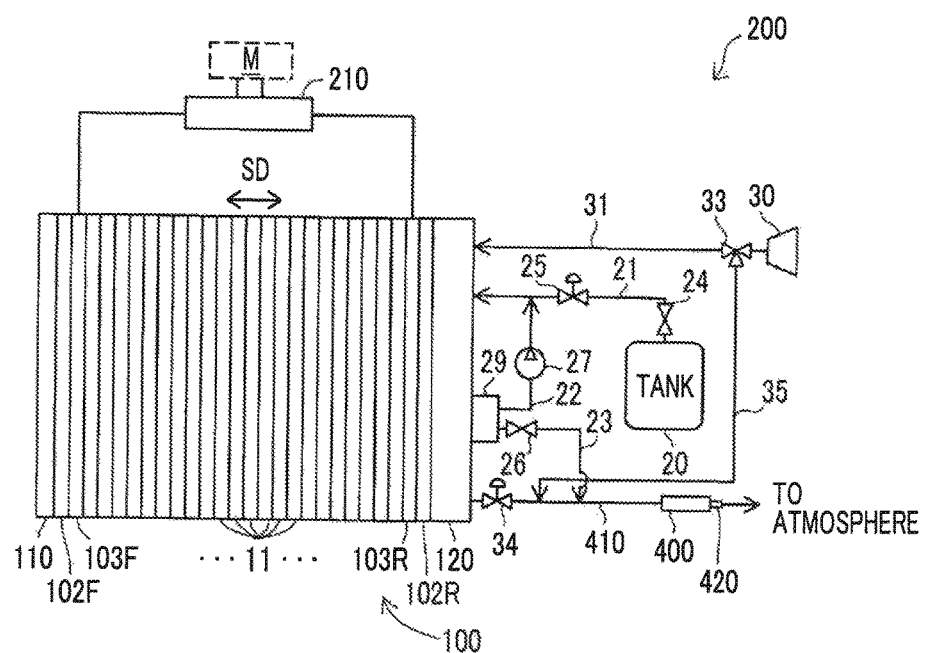
FIG. 3 is a block diagram illustrating a schematic configuration of a fuel cell system that is mounted in the fuel cell vehicle.

FIG. 3 is a block diagram illustrating a schematic configuration of the fuel cell system 200 that is mounted in the fuel cell vehicle 500. The fuel cell system 200 is provided with a gas-liquid separator 29, an air compressor 30, a shut-off valve 24, an injector 25, an exhaust and drain valve 26, a circulation pump 27, a three-way valve 33, a pressure regulating valve 34, a fuel gas supply path 21, a fuel gas circulation path 22, a fuel gas discharge path 23, an oxidant gas supply path 31, a bypass flow path 35, and a DC-DC converter 210 in addition to the fuel cell stack 100, the muffler 400, the first discharge flow path 410, and the second discharge flow path 420 described above. The fuel cell system 200 is also provided with a mechanism (not illustrated) that circulates a cooling medium via the fuel cell stack 100.

The fuel cell stack 100 is provided with the stacked single cells 11. The fuel cell stack 100 is also provided with a pair of end plates 110, 120 in both end portions in a stacking direction SD of the single cells 11. Each of the single cells 11 is a solid polymer-type fuel cell and generates electric power by an electrochemical reaction between fuel gas supplied to an anode side catalyst electrode layer and oxidant gas supplied to a cathode side catalyst electrode layer with the catalyst electrode layers disposed across a solid polymer electrolyte membrane. In the present embodiment, the fuel gas is hydrogen gas and the oxidant gas is air. The fuel cell stack 100 is installed such that the end plate 110 is positioned on the forward direction FD side and the end plate 120 is positioned on the rearward direction RD side. The catalyst electrode layers are configured to include an electrolyte and carbon particles carrying a catalyst such as platinum (Pt). Gas diffusion layers formed by a porous body are disposed on the outer sides of the anode and cathode side catalyst electrode layers of the single cells 11. A carbon porous body such as carbon paper and a carbon cloth, a metal porous body such as a metal mesh and a foamed metal, or the like is used as the porous body. Manifolds (not illustrated) for fuel gas, oxidant gas, and cooling medium circulation are formed along the stacking direction SD of the single cells 11 inside the fuel cell stack 100. The single cell 11 is not limited to the solid polymer-type fuel cell and may be any type of fuel cell, examples of which include a solid oxide-type fuel cell.

The end plates 110, 120 have a function to clamp the stack including the single cells 11. The end plate 120 as one of the end plates 110, 120 has a function to supply the fuel gas, the oxidant gas, and the cooling medium to the manifolds formed in the fuel cell stack 100 and a function to provide a flow path for discharging the media. In contrast, the end plate 110 does not have the functions described above. Each of the end plate 110 and the end plate 120 has a substantially plate-like external shape with its thickness direction corresponding to the stacking direction SD.

The tank 20 stores high-pressure hydrogen and supplies the hydrogen gas as the fuel gas to the fuel cell stack 100 via the fuel gas supply path 21. The tank 20 has a substantially cylindrical external shape and is accommodated in the second chamber 520 such that its longitudinal direction corresponds to the vehicle length direction as illustrated in FIGS. 1 and 2. The shut-off valve 24 is disposed in the vicinity of a fuel gas discharge port of the tank 20 and switches between the execution and stop of the hydrogen gas supply from the tank 20 in response to an instruction from a controller (not illustrated). The injector 25 is disposed on the fuel gas supply path 21 and adjusts the amount (flow rate) and pressure of the hydrogen gas supplied to the fuel cell stack 100. The gas-liquid separator 29 is connected to a fuel gas discharge manifold in the fuel cell stack 100, separates and discharges the water that is contained in the off gas discharged from the manifold, and discharges the water-separated gas (fuel gas). The circulation pump 27 is disposed on the fuel gas circulation path 22 and sends the fuel gas discharged from the gas-liquid separator 29 (water-separated fuel gas) to the fuel gas supply path 21. The exhaust and drain valve 26 is disposed on the fuel gas discharge path 23 and switches between the execution and stop of the water discharge and off gas discharge from the gas-liquid separator 29. The air compressor 30 supplies the air as the oxidant gas to the fuel cell stack 100. The three-way valve 33 is disposed on the oxidant gas supply path 31 and adjusts the amount of the air that is supplied to the oxidant gas supply path 31 and the amount of the air that is supplied to the bypass flow path 35 among the total amount of the air that is supplied from the air compressor 30. The pressure regulating valve 34 is disposed at the part of the first discharge flow path 410 that is connected to the fuel cell stack 100. The pressure regulating valve 34 adjusts the cathode side pressure of each of the single cells 11 by adjusting the cathode discharge side pressure of the fuel cell stack 100 (so-called back pressure).

Fuel gas circulation in the fuel cell system 200 will be described below. The hydrogen gas that is supplied from the tank 20 is supplied to the fuel cell stack 100 via the fuel gas supply path 21. The anode side off gas that is discharged from the fuel cell stack 100 is supplied to the gas-liquid separator 29 and the water that is contained in the anode side off gas is separated at least in part. The water-separated anode side off gas (that is, the fuel gas) returns to the fuel gas supply path 21 via the fuel gas circulation path 22 and the circulation pump 27 and is supplied back to the fuel cell stack 100. Some of the anode side off gas supplied to the gas-liquid separator 29 as well as the water separated from the anode side off gas is discharged from the gas-liquid separator 29 to the fuel gas discharge path 23 via the exhaust and drain valve 26. The fuel gas discharge path 23 is connected to the first discharge flow path 410 and the water and the anode side off gas discharged to the fuel gas discharge path 23 are discharged to the first discharge flow path 410 along with the water and the cathode side off gas discharged from the cathode side of the fuel cell stack 100. The anode side off gas, the cathode side off gas, and the water discharged to the first discharge flow path 410 are discharged to the atmosphere via the muffler 400 and the second discharge flow path 420 as described above. The fuel gas discharge path 23 communicates with the first discharge flow path 410 open to the atmosphere. In contrast, a back pressure that is higher than the atmospheric pressure is applied to the inside of the gas-liquid separator 29, and thus a pressure difference is present across the exhaust and drain valve 26. Accordingly, in a case where the exhaust and drain valve 26 is open, the off gas is discharged from the gas-liquid separator 29 to the fuel gas discharge path 23 because of the pressure difference.

Oxidant gas circulation in the fuel cell system 200 will be described below. The air (compressed air) that is supplied from the air compressor 30 is supplied to the fuel cell stack 100 via the oxidant gas supply path 31. At this time, the amount of the air that is supplied to the fuel cell stack 100 can be adjusted by the opening degree of the three-way valve 33 being adjusted. The cathode side off gas and the water discharged from the fuel cell stack 100 are discharged to the first discharge flow path 410 via the pressure regulating valve 34. The first discharge flow path 410 is connected to the fuel gas discharge path 23 as described above and is connected to the bypass flow path 35 as well. Accordingly, the cathode side off gas discharged from the fuel cell stack 100 is discharged to the atmosphere via the muffler 400 along with the anode side off gas and the water discharged through the fuel gas discharge path 23 and the air discharged through the bypass flow path 35.

As described above, the fuel cell stack 100 is disposed at an angle to the horizontal direction such that its position becomes lowered in the rearward direction RD. Accordingly, the end plate 120 is the closest to the vertical bottom G in the fuel cell stack 100. Accordingly, the water in the fuel cell stack 100 is directed toward the end plate 120 through various manifolds by gravity and drainage from the inside of the fuel cell stack 100 is expedited.

A pair of current collectors 103F, 103R of the fuel cell stack 100 is electrically connected to the DC-DC converter 210. An insulating plate 102F is disposed between the current collector 103F and the end plate 110. Likewise, an insulating plate 102R is disposed between the current collector 103R and the end plate 120. The DC-DC converter 210 is electrically connected to the motor M, boosts the output voltage of the fuel cell stack 100, and supplies it to the motor M.

The operations of the exhaust and drain valve 26, the air compressor 30, the circulation pump 27, and each of the other valves described above are controlled by the controller (not illustrated). The controller may be configured to have, for example, a read-only memory (ROM) storing a control program, a central processing unit (CPU) reading and executing the ROM, and a random access memory (RAM) used as a work area of the CPU.

A3. Position where Muffler is Disposed

Figure 4:
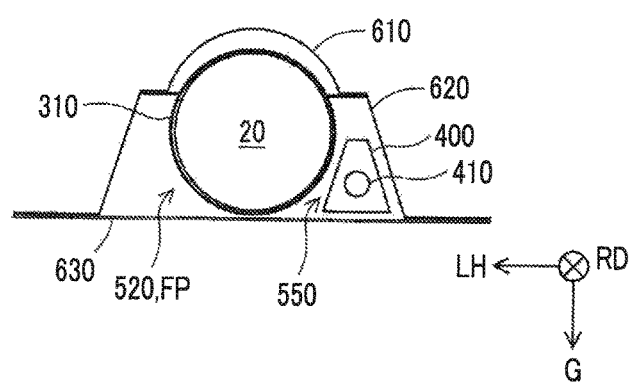
FIG. 4 is a cross-sectional view illustrating the IV-IV cross section that is illustrated in FIG. 1.

FIG. 4 is a cross-sectional view illustrating the IV-IV cross section that is illustrated in FIG. 1. The shape of the muffler 400 is schematically shown in FIG. 4. As illustrated in FIG. 4, the front portion FP is formed by the floor panel 610 on its vertical top, the side wall portions 620, and a lower cover 630. The vehicle member comprises, for example, the floor panel 610, the side wall portions 620, and the lower cover 630. The side wall portions 620 continue downward from the floor panel 610. The side wall portions 620 are positioned in the end portions of the front portion FP in the vehicle width direction LH and form the side walls of the front portion FP in the vehicle width direction LH. The lower cover 630 is formed in the bottom portion of the front portion FP. In the present embodiment, the side wall portions 620 are configured to have a length (width) in the vehicle width direction LH increasing from the top of the vehicle toward the vertical bottom G A space 550 extending along the vehicle length direction is formed between the tank 20 and the side wall portion 620. In the present embodiment, the muffler 400 is disposed in the space 550. In other words, the muffler 400 is disposed between the tank 20 and the side wall portion 620. Accordingly, interference of the muffler 400 with the tank 20 is sufficiently suppressed. The muffler 400 is fixed to the side wall portion 620 by an attachment member (not illustrated).

As illustrated in FIG. 1, the muffler 400 is disposed in the front portion FP and behind the first attachment member 310 in the rearward direction RD. In other words, the first attachment member 310 is disposed in front of the muffler 400 in the forward direction FD. Accordingly, interference of the muffler 400 with the first attachment member 310 is sufficiently suppressed. In addition, the first attachment member 310 is disposed on the forward direction FD side in the front portion FP, that is, the part of the front portion FP that has a relatively larger volume, and thus a worker can attach the tank 20 with ease. The muffler 400 is disposed in front of the rear seats RS in the forward direction FD. More specifically, the muffler 400 is disposed almost at the same position as the front seats FS. Accordingly, the expansion of an upward protruding region that is attributable to the installation of the muffler 400 can be suppressed on the floor (floor panel 610) in the vicinity of the rear seats RS and a reduction in spatial volume can be suppressed in the vicinity of the rear seats RS. A decrease in the area of the foot spaces of the rear seats RS, in particular, can be suppressed.

As illustrated in FIG. 1, the muffler 400 is positioned below the fuel cell stack 100. Accordingly, the water that is discharged from the fuel cell stack 100 can be easily discharged by means of gravity and a reverse flow of the water discharged from the fuel cell stack 100 toward the fuel cell stack 100 can be suppressed. Because of the above-described positional relationship between the fuel cell stack 100 and the muffler 400, the first discharge flow path 410 is inclined such that its position becomes lowered in the rearward direction RD. That is, a front part of the discharge flow path 410 is higher than a rear part of the discharge flow path 410. As described above, the front portion FP is configured such that its height decreases in the rearward direction RD. Accordingly, a reduction in the volume of the third chamber 530 can be suppressed, by the space for the disposition of the first discharge flow path 410 being reduced, and the above-described inclined disposition of the first discharge flow path 410 can be realized at the same time.

In the fuel cell vehicle 500 according to the embodiment described above, the muffler 400 is disposed between the side wall portion 620 and the tank 20 in the front portion FP and the front portion FP is longer than the rear portion RP in average length in the vehicle width direction LH. Accordingly, the muffler 400 can be disposed in the second chamber 520 while interference of the muffler 400 with the tank 20 is sufficiently suppressed. The average length of the rear portion RP in the vehicle width direction LH is shorter than the average length of the front portion FP in the vehicle width direction LH and the muffler 400 is not disposed in the rear portion RP of the second chamber 520, and thus a reduction in the volume of the third chamber 530 (occupant compartment) that is attributable to the installation of the muffler 400 can be suppressed.

The front portion FP is configured such that its length in the vehicle width direction LH decreases from its front toward its rear along the vehicle length direction. Accordingly, a reduction in the volume of the third chamber 530 (occupant compartment) can be suppressed.

The first attachment member 310 is disposed in front of the muffler 400 in the vehicle length direction, and thus interference of the first attachment member 310 with the muffler 400 can be sufficiently suppressed. In addition, the first attachment member 310 is attached to the part of the front portion FP that has a larger spatial volume unlike in a configuration in which the first attachment member 310 is disposed at the same position as or behind the muffler 400 in the vehicle length direction. Accordingly, a worker can attach the tank 20 with ease.

The muffler 400 is disposed in front of the rear seats RS in the vehicle length direction. As a result, the expansion of an upward protruding region that is attributable to the disposition of the muffler 400 can be suppressed on the floor (floor panel 610) in the vicinity of the rear seats RS and a reduction in spatial volume can be suppressed in the vicinity of the rear seats RS. A decrease in the area of the foot spaces of the rear seats RS, in particular, can be suppressed.

The muffler 400 is disposed below the fuel cell stack 100. As a result, the water that is discharged from the fuel cell stack 100 can be guided to the muffler by means of gravity and a reverse flow of the discharged water toward the fuel cell stack 100 can be suppressed.

The front portion FP is configured such that its vertical-direction length decreases from its front toward its rear, and thus a reduction in the volume of the third chamber 530 (occupant compartment) can be suppressed while the space for the disposition of the muffler 400 is ensured.

B. Modification Example

B1. Modification Example 1

In the embodiment described above, the front portion FP is configured such that its length in the vehicle width direction LH gradually decreases in the rearward direction RD. However, the disclosure is not limited thereto. The front portion FP may also be configured such that its length in the vehicle width direction LH decreases in stages (in a stepwise manner) in the rearward direction RD. In addition, the front portion FP may be configured such that its length in the vehicle width direction LH is constant over the vehicle length direction or gradually increases in the rearward direction RD. Even when these configurations are adopted, effects similar to those of the fuel cell vehicle 500 according to the embodiment described above are achieved by the front portion FP accommodating the muffler 400 with the average length of the rear portion RP in the vehicle width direction LH shorter than the average length of the front portion FP in the vehicle width direction LH.

B2. Modification Example 2

In the embodiment described above, the first attachment member 310 is disposed in front of the muffler 400 in the vehicle length direction. However, the disclosure is not limited thereto. For example, the first attachment member 310 may be at the same position as or behind the muffler 400 in the vehicle length direction. Even when this configuration is adopted, effects similar to those of the fuel cell vehicle 500 according to the embodiment described above are achieved by the second chamber 520 accommodating the muffler 400.

B3. Modification Example 3

In the embodiment described above, the muffler 400 is disposed in front of the rear seats RS in the vehicle length direction. However, the disclosure is not limited thereto. For example, the muffler 400 may be at the same position as or behind the rear seats RS in the vehicle length direction. Even when this configuration is adopted, effects similar to those of the fuel cell vehicle 500 according to the embodiment described above are achieved by the second chamber 520 accommodating the muffler 400.

B4. Modification Example 4

In the embodiment described above, the muffler 400 is disposed below the fuel cell stack 100. However, the disclosure is not limited thereto. The muffler 400 may also be positioned above the fuel cell stack 100 or be at the same position as the fuel cell stack 100 in the vertical direction. For example, the fuel cell stack 100 may be positioned at a lower part of the first chamber 510 and disposed almost at the same height as the muffler 400. Even when this configuration is adopted, effects similar to those of the fuel cell vehicle 500 according to the embodiment described above are achieved by the second chamber 520 accommodating the muffler 400.

B5. Modification Example 5

In the embodiment described above, the front portion FP is configured such that its vertical-direction length gradually decreases in the rearward direction RD. However, the disclosure is not limited thereto. The front portion FP may also be configured such that its vertical-direction length decreases in stages (in a stepwise manner) in the rearward direction RD. In addition, the front portion FP may be configured such that its vertical-direction length is constant over the vehicle length direction or increases in the rearward direction RD. Even when this configuration is adopted, effects similar to those of the fuel cell vehicle 500 according to the embodiment described above are achieved by the second chamber 520 accommodating the muffler 400.

B6. Modification Example 6

The configuration of the fuel cell vehicle 500 according to the embodiment described above is merely an example and can be modified in various forms. For example, the cathode side off gas and the anode side off gas may be discharged through separate flow paths instead of being discharged through the single first discharge flow path 410. In this case, the muffler 400 may be disposed on each of the discharge flow paths for the cathode side off gas and the anode side off gas with at least one of the mufflers 400 accommodated in the space 550. The fuel cell stack 100 may not be disposed such that it is inclined downward toward the rearward direction RD side in the vehicle length direction. For example, the fuel cell stack 100 may be horizontally disposed instead. The fuel cell stack 100 does not necessarily have to be disposed in the first chamber 510. Alternatively, the fuel cell stack 100 may be disposed on the rearward direction RD side of the fuel cell vehicle 500, for example, a space behind the rear seats RS instead of the first chamber 510. In this configuration, the muffler 400 may be accommodated in the second chamber 520 with the configuration of the second chamber 520 reversed in its front-rear direction. The lower cover 630 may be omitted.

The disclosure is not limited to the embodiment and the modification examples described above and can be realized in various forms without departing from the scope of the disclosure. For example, the technical features of the embodiment and the modification examples corresponding to the technical features of each form described in the Summary of the specification can be appropriately replaced or combined so that some or all of the above problems are solved or some or all of the above-described effects are achieved. In addition, the technical features can be appropriately deleted insofar as the technical features are not described as indispensable features according to the specification.

What is claimed is:

1. A fuel cell vehicle comprising:
a fuel cell stack;
a tank storing gas to be supplied to the fuel cell stack;
a discharge flow path discharging a fluid to be discharged from the fuel cell stack;
a vehicle member defining a first chamber and a second chamber, the first chamber accommodating the fuel cell stack, the second chamber being disposed behind the first chamber in a vehicle length direction of the fuel cell vehicle and accommodating the tank, the second chamber having a front portion and a rear portion continuous with the front portion in the vehicle length direction, and an average length of the rear portion in a vehicle width direction of the fuel cell vehicle being shorter than an average length of the front portion in the vehicle width direction; and
a muffler attached to the discharge flow paths, the muffler being accommodated in the second chamber and disposed between the tank and one of a pair of side wall portions defining side walls of the front portion in the vehicle width direction.

2. The fuel cell vehicle according to claim 1, wherein the front portion is configured to have a length in the vehicle width direction decreasing from a front of the front portion toward a rear of the front portion along the vehicle length direction.

3. The fuel cell vehicle according to claim 1, wherein the front portion is configured to have a vertical-direction height decreasing from the front of the front portion toward the rear of the front portion along the vehicle length direction.

4. The fuel cell vehicle according to claim 1, wherein the rear portion is configured such that an average vertical-direction height of the rear portion is lower than an average vertical-direction height of the front portion.

5. The fuel cell vehicle according to claim 1, further comprising a first attachment member disposed in the front portion,
wherein the tank is attached to the fuel cell vehicle by the first attachment member, and the first attachment member is disposed in front of the muffler in the vehicle length direction.

6. The fuel cell vehicle according to claim 1, wherein:
the muffler is disposed in the front portion of the second chamber;
the tank is disposed across the front portion and the rear portion of the second chamber;
the fuel cell vehicle further comprises a second attachment member disposed in the rear portion of the second chamber: and
the tank is attached to the fuel cell vehicle by the second attachment member.

7. The fuel cell vehicle according to claim 1, further comprising a floor panel positioned above the second chamber and partitioning the second chamber from a third chamber accommodating front seats and rear seats,
wherein the muffler is disposed in front of the rear seats in the vehicle length direction.

8. The fuel cell vehicle according to claim 1, wherein the muffler is disposed behind and below the fuel cell stack in the vehicle length direction.

9. The fuel cell vehicle according to claim 1, wherein the front portion is configured to have a vertical-direction length decreasing from the front of the front portion toward the rear of the front portion along the vehicle length direction.

10. The fuel cell vehicle according to claim 1, wherein the second chamber is disposed along the vehicle length direction at a middle of the fuel cell vehicle in a vehicle width direction.

11. The fuel cell vehicle according to claim 1, wherein:
   the side wall portions are disposed with a gap in the vehicle width direction; and
   the side wall portions are disposed such that a length of the gap increases from a vertical top toward a vertical bottom of the front portion.

12. The fuel cell vehicle according to claim 1, wherein the discharge flow path is inclined such that a front part of the discharge flow path is higher than a rear part of the discharge flow path.

* * * * *